(12) United States Patent
Iino et al.

(10) Patent No.: US 7,521,142 B2
(45) Date of Patent: Apr. 21, 2009

(54) FUEL CELL SEPARATOR AND PRODUCTION PROCESS THEREOF

(75) Inventors: Tadashi Iino, Kawasaki (JP); Zenichiro Izumi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 344 days.

(21) Appl. No.: 10/582,366

(22) PCT Filed: Dec. 22, 2004

(86) PCT No.: PCT/JP2004/019703

§ 371 (c)(1),
(2), (4) Date: Jun. 9, 2006

(87) PCT Pub. No.: WO2005/062407

PCT Pub. Date: Jul. 7, 2005

(65) Prior Publication Data

US 2007/0178349 A1    Aug. 2, 2007

Related U.S. Application Data

(60) Provisional application No. 60/534,988, filed on Jan. 9, 2004.

(30) Foreign Application Priority Data

Dec. 24, 2003   (JP) .............................. 2003-427852

(51) Int. Cl.
*H01M 2/00* (2006.01)
*H01M 5/00* (2006.01)

(52) U.S. Cl. ......................................... 429/34; 264/241
(58) Field of Classification Search ................... 429/34, 429/38; 264/241, 320
See application file for complete search history.

(56) References Cited

U.S. PATENT DOCUMENTS 6,884,535 B2 * 4/2005 Saito et al. ..................... 429/34
2003/0191228 A1   10/2003 Noguchi et al.

FOREIGN PATENT DOCUMENTS

| DE | 19836267 A1 | 2/2000 |
| EP | 1009048 A1 | 6/2000 |
| EP | 1227531 A1 | 7/2002 |
| EP | 1351329 A1 | 10/2003 |

* cited by examiner

*Primary Examiner*—Patrick Ryan
*Assistant Examiner*—Thomas H. Parsons
(74) *Attorney, Agent, or Firm*—Sughrue Mion, PLLC (57) ABSTRACT

A fuel cell separator having a surface layer on one side or both sides thereof. The surface layer includes at least two layers, wherein the surface layer includes a low-elastic modulus layer (1) having a bending elastic modulus of $1.0 \times 10^1$-$6.0 \times 10^3$ MPa, and a bending strain of 1% or more; and a high-elastic modulus layer (2) having a bending elastic modulus exceeding $6.0 \times 10^3$ MPa, as at least one layer constituting the surface layer, other than the low-elastic modulus layer (1).

16 Claims, 3 Drawing Sheets

MEASUREMENT 1: $R_1 = V_1/A_1$

MEASUREMENT 2: $R_2 = V_2/A_2$

FUEL CELL SEPARATOR AND PRODUCTION PROCESS THEREOF

This application claims the priority of an application based on U.S. Provisional Application Ser. No. 60/534,988 (filed on Jan. 9, 2004).

TECHNICAL FIELD

The present invention relates to a separator having an excellent characteristic such as contact resistance and penetration resistance, and a process for producing the same.

BACKGROUND ART

In view of environmental problems and energy problems, fuel cells have attracted much attention as clean power-generating devices, because they generate electric power by a reverse reaction of electrolysis by using hydrogen and oxygen, and they produce no exhaust material other than water The fuel cells can be classified into several kinds, depending on the kind of the electrolyte to be used therefor. Among such fuel cells, solid polymer electrolyte-type fuel cells can work at a low temperature, and therefore they are most useful for automobile or public or civilian uses. This type of fuel cell is constructed by stacking unit cells, each of which comprises, e.g., a polymer electrolyte, a gas diffusion electrode, a catalyst and a separator, and the fuel cell can attain high-output power generation.

In the fuel cell having the above structure, the separator for partitioning the unit cells usually has at least one flow channel (or groove) to which a fuel gas (such as hydrogen) and an oxidant gas (such as oxygen) are supplied, and from which the produced water content (steam) is discharged. Therefore, the separator is required to have a high gas impermeability capable of perfectly separating these gases, and is also required to have a high electroconductivity to reduce the internal resistance. Further, the separator is required to be excellent in heat conductivity, durability, strength, etc.

To satisfy these requirements, the separator has been heretofore studied in view of both aspects of metal and carbon materials to be used therefor. Among these materials, metals have a problem in the corrosion resistance thereof and therefore, an attempt has been made to cover the surface thereof with a noble metal or carbon. However, even in such a case, a sufficiently high durability cannot be obtained and moreover, the cost for covering the metal is problematic.

On the other hand, a large number of carbon materials have been studied as materials for constituting fuel cell separators, and examples thereof include a molded article obtained by press-molding an expanded graphite sheet, a molded article obtained by impregnating a carbon sintered body with a resin and curing (or hardening) the resin, a vitreous carbon obtained by baking a thermosetting resin, and a molded article obtained by mixing a carbon powder and a resin and molding the resultant mixture.

For example, Patent Document 1 discloses a complicated process such that a binder is added to a carbon powder and mixed under heating, the mixture is CIP (Cold Isostatic Pressing)-molded, baked and graphitized, and the thus obtained isotropic graphite material is impregnated with a thermosetting resin and subjected to a curing treatment, and grooves are engraved therein by cutting. Patent Document 2 discloses a technique of impregnating a paper containing carbon powder or carbon fiber with a thermosetting resin, stacking and press-bonding the resultant papers, and baking the stacked body. Patent Document 3 discloses a technique of injection-molding a phenol resin into a separator-shaped metal mold and baking the molded resin.

Materials subjected to a baking treatment as in these examples exhibit high electroconductivity, but the baking takes a long time and the productivity is low, and these materials have a certain problem such that they have a poor flexural strength. Further, when cut working is necessary, the mass productivity is low and the cost becomes higher, and therefore, these materials can be hardly popularized in future.

On the other hand, with respect to the electroconductivity of a fuel cell separator, it is important to reduce the contact resistance, which is a factor controlling the electroconductivity. There have been made some attempts to reduce the contact resistance. For example, Patent Document 4 discloses a method of covering the surface of a separator with metal or carbon having a high electroconductivity. Patent Document 5 discloses a method of covering the surface of a molded product of an electroconductive resin composition with an electroconductive polymer. Patent Document 6, discloses a method of covering the surface of a separator with an electroconductive material, or a method of embedding an electroconductive material in a separator so that the electroconductive material is disposed in the longitudinal direction of the separator.

On the other hand, Patent Document 7 discloses a method of increasing the area rate of carbon powder, by grinding the surface layer of a separator which is rich in a resin (i.e., a layer predominantly comprising a resin). Patent Document 8 discloses a method of improving the adhesion of the contact surface of a separator, by using a rubber as a binder therefor.

[Patent Document 1] JP-A (Japanese Unexamined Patent Publication) 8-222241
[Patent Document 2] JP-A 60-161144
[Patent Document 3] JP-A 2001-68128
[Patent Document 4] JP-A 2001-196076
[Patent Document 5] JP-A 2002-8685
[Patent Document 6] JP-A 2001-52721
[Patent Document 7] JP-A 2003-282084
[Patent Document 8] JP-A 2001-216977

As described above, the fuel cell separator is particularly required to have a high electroconductivity and a strong corrosion resistance, and to be produced at a low cost. In such a viewpoint, a carbon-based material mold-shaping type which is capable of omitting a cutting step attracts much attention, and the development thereof is promoted. However, in the case of such a carbon-based material, it is necessary to increase the amount of an electroconductivity-imparting material to be contained in the molded product in order to impart the molded product with a high electroconductivity. However, in such a case, the reduction in the amount of a resin to be contained in the molded product is limited to a certain extent, because the molding property should be retained. Accordingly, it is impossible to obtain a sufficiently high electroconductivity.

In addition, because of the large amount of the electroconductivity-imparting material contained in the molded product, the surface of the resultant molded product inevitably has a low smoothness, and a higher hardness, so that the contact resistance of the molded product produced from of an electroconductive resin composition tends to be deteriorated, and the resultant product becomes fragile. In addition, when the surface of the molded product is covered with the binder resin, and the contact resistance thereof is deteriorated, it is necessary to adopt a method of grinding the surface of the molded product.

Further, when the production process includes a baking step of heating the molded product at a high temperature of 1000-3000° C. for a long period so as to obtain a high electroconductivity, the time required for producing the molded product becomes longer, and further the production steps become complicated, and the production costs problematically become high.

On the other hand, a multilayer-type separator has a problem such that the adhesion in a boundary portion between the different kinds of layers is mainly problematic.

DISCLOSURE OF INVENTION

An object of the present invention is to provide a fuel cell separator which has solved a problem encountered in the prior art, and a process for producing the same.

Another object of the present invention is to provide a fuel cell separator which has a low contact resistance and a low penetration resistance.

As a result of earnest study, the present inventors have found that a fuel cell separator having a low contact resistance and a low penetration resistance can be realized by constituting a multi-layer structure comprising a plurality of layers wherein the surface comprises a low-elastic modulus layer having a specific property, and a high-elastic modulus layer having a specific property in addition to the low-elastic modulus layer. The present invention is based of the discovery.

As a result of further study, the present inventors have also found that the contact resistance and the penetration resistance can further be reduced, by incorporating a polymer of the same type, or polymers constituting a pair of compatible (or mutually soluble) polymers, into the compositions constituting the respective layers.

The present inventors have further found that a fuel cell separator having a higher electroconductivity and a lower contact resistance can be provided, by using a composition for the surface layer comprising a low-elastic modulus binder and a carbonaceous material containing boron.

More specifically, for example, the present invention may include the following embodiments [1]-[18].

[1] A fuel cell separator having a surface layer on one side or both sides thereof, the surface layer comprising at least two layers, wherein the surface layer comprises a low-elastic modulus layer (A) having a bending elastic modulus of $1.0\times 10^1$-$6.0\times 10^3$ MPa, and a bending strain of 1% or more; and a high-elastic modulus layer (B) having a bending elastic modulus exceeding $6.0\times 10^3$ MPa, as at least one layer constituting the surface layer, other than the low-elastic modulus layer (A).

[2] A fuel cell separator according to [1], wherein the layer (A) has a thickness of 0.5 mm or less, and the layer (B) has a thickness of 0.05-2 mm.

[3] A fuel cell separator according to [1] or [2] having a layer structure of layer (A)/layer (B)/layer (A) and a total thickness of 0.2-3 mm, wherein the thickness ratio (A/B) therebetween is 0.001-1.

[4] A fuel cell separator according to any of [1]-[3], wherein the layer (A) and/or layer (B) comprises an electroconductive resin composite material comprising 40-2 mass % of (a) resin binder, and 60-98 mass % of an electroconductive substance (b).

[5] A fuel cell separator according to [4], wherein the layer (A) comprises a component (a) including a thermoplastic or thermosetting resin composition of at least two component which comprises 20-99 mass % of an elastomer; and the layer (B) comprises a component (a) including a thermoplastic or thermosetting resin composition which comprises at least one kind of a crystalline polymer having a melting point of 100° C. or more, and/or an amorphous polymer having a glass transition point of 100° C. or more.

[6] A fuel cell separator according to [4], wherein the component (a) constituting the layer (A) and the component (a) constituting the layer (B) comprises at least one species of a polymer of the same kinds, or components c providing a compatible polymer pair.

[7] A fuel cell separator according to [4] or [5], wherein the component (a) is a composition comprising at least one kind selected from: phenolic resins, epoxy resins, vinyl ester resins, allyl ester resins, and 1,2-poly butadiene.

[8] A fuel cell separator according to [4] or [5], wherein the component (a) is a composition comprising at least one kind selected from: polyolefins, polyphenyl sulfides, fluorine-containing resins, polyamides, and polyacetals.

[9] A fuel cell separator according to [4], wherein the component (a) comprises a composition of a polyolefin, and at least one kind selected from: hydrogenated styrene-butadiene rubbers, styrene-ethylene-butylene-styrene block copolymers, styrene-ethylene-propylene-styrene block copolymers, crystalline olefin-ethylene-butylene-crystalline olefin block copolymers, styrene-ethylene-butylene-crystalline olefin block copolymers, styrene-isoprene-styrene block copolymers, and styrene-butadiene-styrene block copolymer.

[10] A fuel cell separator according to [4], wherein the component (a) comprises polyvinylidene fluoride and soft acrylic resin.

[11] A fuel cell separator according to any of [4]-[10], wherein the component (b) is at least one kind of substance selected from: metals, carbonaceous materials, electroconductive polymers, and metal-coated fillers.

[12] A fuel cell separator according to any of [4]-[10], wherein the component (b) is a carbonaceous material comprising boron in an amount of 0.05-5 mass %.

[13] A fuel cell separator according to any of [4]-[12], wherein the component (b) comprises 0.1-50 mass % of vapor-phase grown carbon fiber and/or carbon nanotube.

[14] A fuel cell separator according to [13], wherein the vapor-phase grown carbon fiber or carbon nanotube contains boron in an amount of 0.05-5 mass %.

[15] A process for producing a fuel cell separator having a surface layer on one side or both sides thereof, the surface layer comprising at least two layers, wherein the surface layer comprises a low-elastic modulus layer (A) having a bending elastic modulus of $1.0\times 10^1$-$6.0\times 10^3$ MPa, and a bending strain of 1% or more; and a high-elastic modulus layer (B) having a bending elastic modulus exceeding $6.0\times 10^3$ MPa, as at least one layer constituting the surface layer, other than the low-elastic modulus layer (A);

the process comprising: molding a low-elastic modulus layer (A) and a high-elastic modulus layer (B) by at least one method selected from rolling, compression molding and stamping, to thereby provide a laminate having a groove on both sides thereof.

[16] A process for producing a fuel cell separator having a surface layer on one side or both sides thereof, the surface layer comprising at least two layers, wherein the surface layer comprises a low-elastic modulus layer (A) having a bending elastic modulus of $1.0\times 10^1$-$6.0\times 10^3$ MPa, and a bending strain of 1% or more; and a high-elastic modulus layer (B) having a bending elastic modulus exceeding $6.0\times 10^3$ MPa, as at least one layer constituting the surface layer, other than the low-elastic modulus layer (A);

the process comprising: molding a low-elastic modulus layer (A) and a high-elastic modulus layer (B) by at least one method selected from multi-layer extruding, multi-layer injection molding, compression molding or rolling, to thereby provide a laminate in the form of a sheet; and forming a groove on both sides of the laminate by compression molding or stamping.

[17] A process for producing a fuel cell separator according to [15] or [16], wherein the layer (A) has a thickness of 0.5 mm or less, and the layer (B) has a thickness of 0.05-2 mm.

[18] A process for producing a fuel cell separator according to [15] or [16], wherein the fuel cell separator has a layer structure of layer (A)/layer (B)/layer (A) and a total thickness of 0.2-3 mm, and the thickness ratio (A/B) therebetween is 0.001-1.

In the drawings, the respective reference numerals have the following meanings respectively.

1: low-elastic modulus layer
2: high-elastic modulus layer
11: carbon
12: test piece
13: brass coated with gold plating
14: constant-current generator
15: voltmeter
21: test piece
22: brass coated with gold plating
23: constant-current generator
24: voltmeter

BEST MODE FOR CARRYING OUT THE INVENTION

Hereinbelow, the present invention will be described in detail, with reference to the accompanying drawings as desired. In the following description, "%" and "part(s)" representing a quantitative proportion or ratio are those based on mass, unless otherwise specifically noted.

(Fuel cell Separator)

Figure 1:
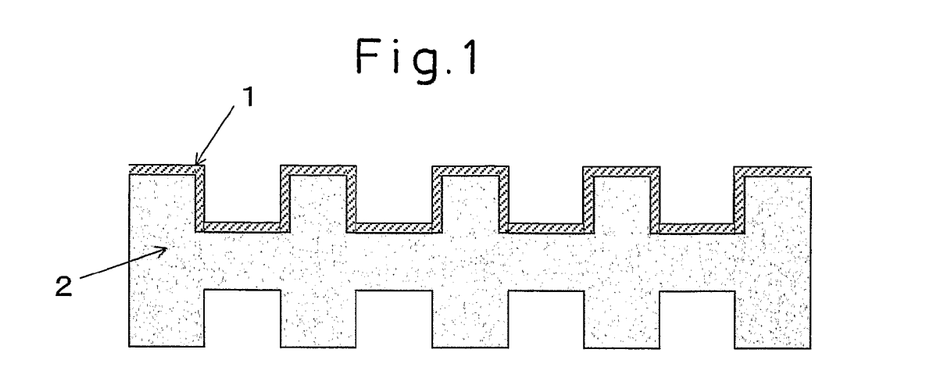
FIG. 1 is a schematic sectional view showing an example of the separator according to the present invention.
Figure 2:
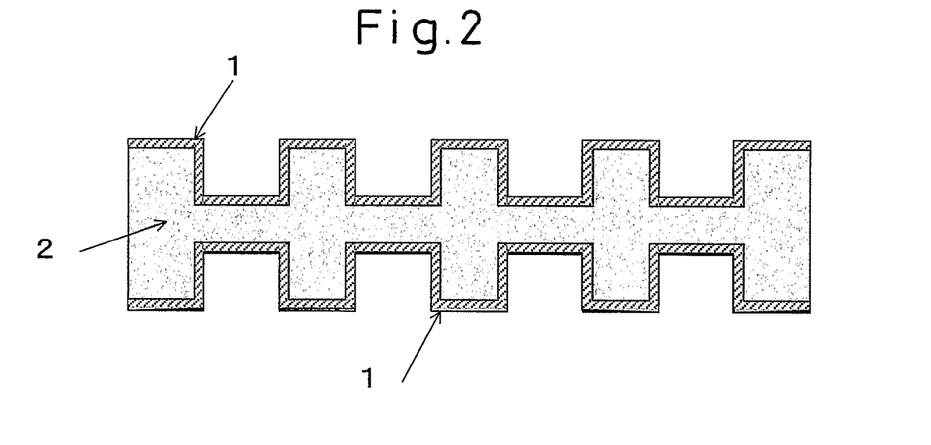
FIG. 2 is a schematic sectional view showing another example of the separator according to the present invention.
Figure 3:
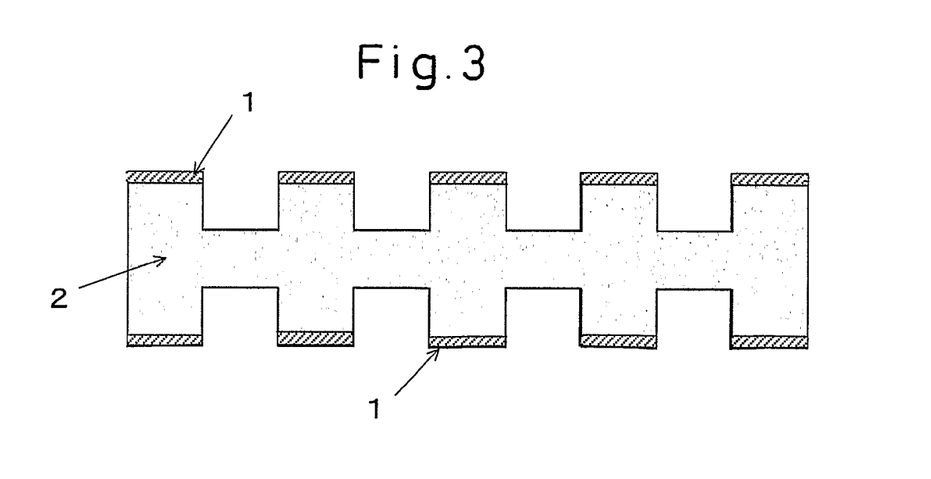
FIG. 3 is a schematic sectional view showing a further example of the separator according to the present invention.

The fuel cell separator according to the present invention comprises, as a surface layer on one side thereof, or as surface layers on both sides thereof, at least two layers comprising: a low-elastic modulus layer (A) having a bending elastic modulus of $1.0 \times 10^1$-$6.0 \times 10^3$ MPa, and a bending strain of 1% or more; and a high-elastic modulus layer (B) having a bending elastic modulus exceeding $6.0 \times 10^3$ MPa. Some representative embodiments of the fuel cell separator according to the present invention are shown in schematic sectional views of FIG. 1, FIG. 2, and FIG. 3. In these figures, the fuel cell separator has a multi-layer structure comprising at least two layers, and the at least two layers comprises a surface layer including a low-elastic modulus layer 1, and a high-elastic modulus layer 2.

(Bending Elastic Modulus)

In the present invention, the low-elastic modulus layer (A) has a bending elastic modulus of $1.0 \times 10^1$-$6.0 \times 10^3$ MPa, preferably $2.0 \times 10^1$-$5.5 \times 10^3$ MPa, more preferably $3.0 \times 10^1$-$5.0 \times 10^3$ MPa. When the bending elastic modulus is below $1.0 \times 10^1$ MPa, the low-elastic modulus layer is liable to be deformed due to the clamping by the stacking in the fuel cell so that a groove is liable to be collapsed or broken. On the other hand, when the bending elastic modulus exceeds $6.0 \times 10^3$ MPa, the surface becomes hard, and the contact resistance among the gas diffusion electrode, separator, and collector is liable to be large.

The low-elastic modulus layer (A) has a bending strain of 1% or more, preferably 1.2% or more, more preferably 1.4% or more. When the bending strain is less than 1%, the surface of the separator is liable to be cracked or flawed.

In the present invention, the high-elastic modulus layer (B) has a bending elastic modulus exceeding $6.0 \times 10^3$ MPa, preferably $6.5 \times 10^3$ MPa or more, more preferably $7.0 \times 10^3$ MPa or more. When the bending elastic modulus is and $6.0 \times 10^3$ MPa or less, the clamping in the fuel cell stacking can be problematic (Thickness of Respective Layer)

In the present invention, the layer (A) may preferably have a thickness of 0.5 mm or less, more preferably 0.4 mm or less, further preferably 0.3 mm or less. When the thickness of the layer (A) exceeds 0.5 mm, the groove is liable to be collapsed due to the clamping in the stacking.

In the present invention, the layer (B) may preferably have a thickness of 0.05-2 mm, more preferably 0.07-1.8 mm or less, further preferably 0.09-1.6 mm. When the thickness of the layer (B) is less than 0.05 mm, the gas barrier property thereof is liable to be decreased. On the other hand, when the thickness of the layer (B) exceeds 2 mm, the penetration resistance is liable to be increased.

The total thickness of the multi-layer structure may preferably be 0.2-3 mm, more preferably 0.2-2.8 mm, further preferably 0.25-2.6 mm. When the total thickness is less than 0.2 mm, it is not easy to secure the depth of the groove. On the other hand, when the total thickness exceed 3 mm, the electroconductivity in the penetration direction is liable to be decreased.

The ratio (A/B) between the thicknesses of the low-elastic modulus layer (A) and the high-elastic modulus layer (B) may preferably be 0.001-1, more preferably more preferably 0.05-1, further preferably 0.05-0.8. When the thickness ratio (A/B) is less than 0.001, the thickness of the low-elastic modulus layer is too small, and the effect of reducing the contact resistance can be lowered. On the other hand, when the thickness ratio (A/B) exceeds 1, a creep phenomenon is liable to occur.

In order measure the thickness, for example, it is possible that the plane of a sample to be measured is divided into 20 sections, and the thicknesses of the thus divided 20 sections are measured by using a micrometer capable of measuring to a precision of 0.01 mm, and the measured values are averaged. However, the measurement method to be used in the present invention is not limited to such a method.

(Low-Elastic Modulus Layer and/or High-Elastic Modulus Layer)

In the present invention, the low-elastic modulus layer and/or the high-elastic modulus layer may preferably comprise an electroconductive resin composite including (a) a resin composition binder, and (b) an electroconductive substance. When the resin composition binder is not present, it is difficult to effect mold shaping. When the electroconductive substance is not present, it is difficult for the separator to perform its function.

With respect to the composition ratio of the component (a) and the component (b) in the present invention, it is preferred that the component (a) constitutes 40-2 mass %, and the component (b) constitutes 60-98 mass %. It is more preferred that the component (a) constitutes 30-5 mass %, and the component (b) constitutes 70-95 mass %. It is further preferred that the component (a) constitutes 25-5 mass %, and the component (b) constitutes 75-95 mass %. When the ratio of the component (a) is less than 2 mass %, the molding property is liable to be poor. On the other hand, the ratio of the component (a) exceeds 40 mass %, the volume resistivity is liable to be 1 $\Omega$cm or more.

(Component (a))

In the present invention, the component (a) may preferably comprise a thermosetting resin composition and/or a thermoplastic resin composition. It is particularly preferred that the low-elastic modulus layer comprises an electroconductive composite material including a resin composition binder including two or more components (inclusive of an elastomer component), and an electroconductive substance which has been added to the resin composition binder. The low-elastic modulus layer may preferably comprise an elastomer component in an amount 20-99 mass %, more preferably 25-95 mass %, further preferably 30-95 mass %.

(Elastomer)

In the present invention, the elastomer refers to a polymer having a rubber-like elasticity in neighborhood of normal temperature. As the elastomer, it is possible to use one kind or combination of at least two kinds of polymers selected from: e.g., acrylonitrile-butadiene rubber, hydrogenated nitrile rubber, styrene-butadiene rubber, ethylene-propylene rubber, ethylene-propylene-diene terpolymerization rubber, ethylene-butadiene rubber, fluorine-containing rubber, isoprene rubber, silicone rubber, acrylic elastomer, butadiene rubber, high-styrene rubber, chloroprene rubber, urethane rubber, polyether-type special rubber, tetrafluoroethylene-propylene rubber, epichlorohydrin rubber, norbornene rubber, butyl rubber, styrene-type thermoplastic elastomer, olefin-type thermoplastic elastomer, urethane-type thermoplastic elastomer, polyester-type thermoplastic elastomer, polyamide-type thermoplastic elastomer, 1,2-polybutadiene-type thermoplastic elastomer, fluorine-containing thermoplastic elastomer, soft acrylic acid resin, etc.

Among these, in view of the resistance to hydrolysis, it is preferred to use as the elastomer, acrylonitrile-butadiene rubber, hydrogenated nitrile rubber, styrene-butadiene rubber, ethylene-propylene rubber, ethylene-propylene-diene terpolymerization rubber, ethylene-butadiene rubber, isoprene rubber, butadiene rubber, acrylic elastomer, styrene-type thermoplastic elastomer, olefin-type thermoplastic elastomer, 1,2-poly butadiene thermoplastic elastomer, fluorine-containing thermoplastic elastomer, soft acrylic acid resin.

(High-Elastic Modulus Layer)

On the other hand, the high-elastic modulus layer, may preferably comprise a resin composition binder including at least one kind of an amorphous polymer having a glass transition point of 100° C. or more, and/or a crystalline polymer having a melting point of 100° C. or more, and a large amount of an electroconductive substance which has been added into the resin composition binder. The melting point and glass transition point may preferably be 105° C. or more, more preferably 110° C. or more. When the melting point and glass transition point is less than 100° C., the durability as a fuel cell tends to cause a problem.

For example, the above-mentioned melting point and glass transition point can be measured, in accordance with the DSC method as described in JIS K7121, by using Model DSC-7 apparatus, mfd. by Perkin-Elmer Co. However, the measuring method to be used for such a purpose is not limited to this method.

(Other Component)

In the separator according to the present invention having a multi-layer structure, the interfacial adhesion is particularly important. Therefore, it is preferred to enhance the interfacial strength and adhesion by incorporating a polymer of the same kind, or polymers constituting to a compatible polymer pair into the components constituting the respective layers of the low-elastic modulus layer and the high-elastic modulus layer.

The polymer of the same kind refers to a plurality of polymers having a basic or fundamental molecular structure of the same kind, so that these polymer molecules can be entangled with each other. In such a viewpoint, in the present invention, it is preferred that the same polymer is included in each of the layer (A) and layer (B). On the other hand, the compatible polymer pair refers to a plurality of polymers of different kinds of polymers such that these polymer molecules can be partially entangled with each other, so that a portion of the first kind of polymer molecules receives a portion of the second kind of polymer molecules, and vice versa. In the present invention, the compatible polymer pair may also be a combination of polymers such that these polymer molecules can be partially entangled with each other with the aid of a compatibilizing (or compatibility-imparting) agent. For example, it is preferred to incorporate two kinds of polymers having the same molecular structure as a portion of each of these polymers into both of the and layer (A) and layer (B). When the compatibilizing agent is used, it is preferred to incorporate the same compatibilizing agent into both of the and layer (A) and layer (B).

(Component having Adhesion-Imparting Functional Group)

Further, in order to enhance the interfacial strength, it is also possible, as desired, to incorporate a component having an adhesion-imparting functional group in the respective layers so that the component promote the adhesion between the respective layers by a chemical reaction. Specific examples of the component having an adhesion-imparting functional group may include: monomers and polymers having a functional group such as hydroxyl group, carboxyl group, amino group, epoxy group, isocyanate group, glycidyl methacrylate group, carbonyl group, acrylic group, maleic acid anhydride group, silyl group, and amine-type functional group. However, the functional groups to be usable in the present invention are not limited to these specific examples. When one of these components is included in the layer, the interfacial strength may be increased by such a technique, so as to more effectively suppress the interfacial delamination or peeling due to thermal history.

(Thermosetting Resin)

Examples of the thermosetting resin for use in the present invention may include: phenolic resin, unsaturated polyester resin, epoxy resin, vinyl ester resin, alkyd resin, acrylic resin, melamine resin, xylene resin, guanamine resin, diallyl phthalate resin, allyl ester resin, furan resin, imido resin, urethane resin, urea resin, etc. Among these, it is more preferred to use one kind, or a combination of plural kinds of resins selected from: phenolic resin, unsaturated polyester resin, epoxy resin, vinyl ester resin, allyl ester resin, and 1,2-polybutadiene.

In the field where a gas-tightness is required, a resin which does not produce a gas at the curing reaction may preferably be selected. Specific examples of such a resin may include: a combination of epoxy resin and phenol resin, unsaturated polyester resin, vinyl ester resin, allyl ester resin, 1,2-polybutadiene, etc. By using such a resin, a formed product having substantially no voids in the cured product and having a high gas-tightness can be obtained.

In the field where heat resistance, acid resistance, etc., is required, a resin having a molecular skeleton such as bisphenol-A type, novolak-type or cresol novolak-type is preferred. For example, it is preferred to use epoxy resin, phenolic resin, vinyl ester resin, allyl ester resin, or 1,2-polybutadiene, etc.

(Thermoplastic Resin)

Specific examples of the thermoplastic resin to be usable in the present invention may include: acrylonitrile-butadiene-styrene copolymer, polystyrene, acrylic acid resin, polyvinyl chloride, polyimide, liquid crystal polymer, polyether ether ketone, fluorine-containing resin, polyolefin, polyacetal, polyamide, polyethylene terephthalate, polybutylene terephthalate, polycarbonate, polycycloolefin, polyphenylene sulfide, polyether sulfone, polyphenylene oxide, polyphenylene sulfone, etc.

Among these, it is preferred to use one kind or plural kinds selected from: fluorine-containing resin, polybutylene terephthalate, polyphenylene sulfide, liquid crystal polymer, polyether ether ketone, polycycloolefin, and polyolefin having a melting point of 100° C. or more; and polystyrene, polyphenylene oxide, and polycarbonate, having a glass transition point of 100° C. or more.

(Combination of the Thermoplastic Resin and Elastomer)

Specific preferred examples of a combination of the thermoplastic resin and elastomer to be used for the component (a) of the Layer (A) in the present invention may include: copolymer of polystyrene and polybutadiene, copolymer of polystyrene and isoprene rubber, mixture of polyolefin and styrene-type thermoplastic elastomer, mixture of polyvinylidene fluoride and acrylic acid resin, mixture of polyphenylene sulfide and maleic anhydride-modified styrene-type thermoplastic elastomer, etc.

In addition, it is also possible to use copolymer of a thermoplastic resin and an elastomer component, a polymer alloy which has been obtained by using a compatibility-imparting agent or surfactant, so that the thermoplastic resin and elastomer component are caused to have a micro-phase separation structure, etc.

Among these, it is preferred to use the combination of polyolefin and styrene-type thermoplastic elastomer, polyvinylidene fluoride and acrylic acid resin, and polyphenylene sulfide and maleic anhydride-modified styrene-type thermoplastic elastomer.

(Styrene-Type Thermoplastic Elastomer)

Specific examples of the styrene-type thermoplastic elastomer in the present invention may include: hydrogenated styrene-butadiene rubber, styrene-ethylene-butylene-styrene block copolymer, styrene-ethylene-propylene-styrene block copolymer, crystalline olefin-ethylene butylene crystalline olefin block copolymer, styrene-ethylene-butylene-crystalline olefin block copolymer, styrene-isoprene-styrene block copolymer, styrene-butadiene-styrene block copolymer, etc. Among these, it is preferred to use hydrogenated styrene-butadiene rubber, styrene-ethylene-butylene-styrene block copolymer, and styrene-ethylene-propylene-styrene block copolymer, and modified products of these polymers.

Herein, the "polyolefin" is a general term for hydrocarbon-type compounds. Specific examples of the polyolefin may include: polypropylene, polyethylene, polybutene, polymethyl pentene, etc. Among these, it is preferred to use polypropylene, or polybutene.

(Other Components)

In addition, the component (a) may further contain various additives, as desired. Specific examples thereof may include a component selected from: for example, monomer, plasticizer, curing or hardening agent, hardening initiator, hardening auxiliary, solvent, ultraviolet stabilizer, antioxidant, heat stabilizer, antifoaming agent, leveling agent, mold lubricant or releasing agent, lubricant, water repellent, thickener, anti-shrink agent, or hydrophilicity-imparting agent.

(Process for Producing Component (a))

The process for producing component (A) according to the present invention is not particularly limited. Specific examples thereof may include: physical processes such as solution method, emulsion method, and fusion method; chemical processes such as graft polymerization method, block polymerization method, IPN (interpenetrating polymer network); etc.

In the case of the production of the component (a) by using a blend of different kinds of polymers, the fusion method may preferably be used. Specific techniques of this fusion method are not particularly limited. Specific examples thereof may include blending methods using any of kneading machines such as roll, kneader, Banbury mixer, and extruder.

(Control of Micro-Phase Separation Structure)

In addition, a desired component (a) can also be obtained by decreasing the interfacial tension with the aid of a compatibility-imparting agent, so as to control the micro-phase separation structure, in addition to the blending of the different kinds of polymers. As the method of controlling such a micro-phase separation structure, it is further preferred to use a production process using reactive processing method, as one of the method of using a continuous extruder involving a polymer reaction.

(Component (b))

The component (b) in the present invention is not particularly limited, as long as the component (b) is an electroconductive substance. The component (b) may preferably comprise one or a combination of two or more kinds of materials selected from: metallic materials, carbon or carbonaceous materials, electroconductive polymers, and fillers coated with a metallic material, or metallic oxides. The component (b) may more preferably comprise a carbon or carbonaceous material and/or a metallic material.

(Metallic Material)

The metallic material may preferably be either one or a combination or composite of two ore more kinds selected from: Ni, Fe, Co, B, Pb, Cr, Cu, Al, Ti, Bi, Sn, W, P, Mo, Ag, Pt, Au, TiC, NbC, TiCN, TiN, CrN, $TiB_2$, $ZrB_2$, and $Fe_2B$. Further, it is also possible to process these metallic materials into powder or fiber form.

(Carbonaceous Material)

The carbonaceous material for use in the present invention is not particularly limited. It is preferred to use, for example, at least one or more materials selected from: carbon black, carbon fiber, amorphous carbon, expanded graphite, artificial graphite, natural graphite, vapor-phase grown carbon fiber, carbon nanotube, and fullerene.

(Carbonaceous Material Containing Boron)

In view of an improvement in the electroconductivity of the carbonaceous material, the carbonaceous material may preferably contain boron, preferably in an amount of 0.05 to 5 mass %. If the amount of boron is or less 0.05 mass %, a desired graphite powder having a high electroconductivity is less liable to be obtained. Even if the amount of boron exceeds 5 mass %, the effect of improving the electroconductivity of the carbon material tends to be decreased.

The method of measuring the quantity of the boron contained in the carbonaceous material is not particularly limited, but the quantity of the boron can be measured by any measurement method. In the present invention, the values thereof may be those which have been determined by an inductive-type (or inductively coupled) plasma emission spectrometry (hereinafter, abbreviated as "ICP"), or an inductive-type (or inductively coupled) plasma emission spectrometry mass spectrometry (hereinafter, abbreviated as "ICP-MS"). More specifically, sulfuric acid and nitric acid are added to a sample to be measured and the resultant mixture is microwave-heated (230° C.) to be decomposed (digester method), and perchloric acid ($HClO_4$) is further added to the decomposition product, and the resultant product is diluted with water. Then, the thus obtained sample is subjected to an ICP emission spectrometer, to thereby measure the quantity of the boron contained therein.

(Method of Incorporating Boron)

Boron can be incorporated into the carbonaceous material, for example, by a method of adding a boron source such as B in an elemental form, $B_4C$, BN, $B_2O_3$ or $H_3BO_3$ to a single substance of natural graphite, artificial graphite, expanded graphite, carbon black, carbon fiber, vapor-phase grown carbon fiber, carbon nanotube or the like, or a mixture of one or more thereof, thoroughly mixing the boron source with the carbonaceous material, and then graphitizing the resultant mixture at about 2,500 to 3,200° C.

If the mixing of boron source is not uniform, the resulting graphite powder is not only non-uniform but also highly probably sintered at the graphitization. For attaining uniform mixing with the boron source, the boron source may preferably be formed into powder having a particle size of 50 µm or less, preferably about 20 µm or less and then mixed with the powder such as coke.

If the carbonaceous material does not contain boron and is graphitized, the graphitization degree (i.e., crystallinity) can be decreased and the lattice spacing thereof can be increased. As a result, a graphite powder having a high electroconductivity is less liable to be obtained. The form of boron contained is not particularly limited, as long as boron and/or a boron compound is mixed in the graphite. However, in a preferred form, boron is present between layers of graphite crystal or a part of carbon atoms constituting the graphite crystal is substituted by boron atoms. In a case where a part of carbon atoms is substituted by boron atoms, the bonding between the boron atom and the carbon atom may be in any bonding form such as covalent bonding or ionic bonding.

(Carbon Black)

Specific examples of the carbon black as one of the carbonaceous material may include: Ketjen black and acetylene black which are obtained by the incomplete combustion of a natural gas and the like or by the thermal decomposition of acetylene, furnace carbon obtained by the incomplete combustion of a hydrocarbon oil or a natural gas, and thermal carbon obtained by the thermal decomposition of a natural gas, etc.

(Carbon Fiber)

Specific examples of the carbon fiber may include: a pitch-type carbon fiber obtained from heavy oil, by-product oil or coal tar, and a PAN-type carbon fiber obtained from polyacrylonitrile.

(Amorphous Carbon)

The above amorphous carbon may be obtained by using a method wherein a phenolic resin is cured and subjected to a baking treatment, and then crushed into powder; or a method wherein a phenolic resin in the form of powder of spherical or indeterminate shape is cured and subjected to a baking treatment, etc. In order to obtain an amorphous carbon having a high electroconductivity, it is suitable to heat-treat the raw material therefor at 2000° C. or more.

(Expanded Graphite Powder)

The expanded graphite powder may be, for example, a powder obtained by a method where a graphite having a highly-grown crystal structure such as natural graphite and pyrolytic graphite is dipped in a strongly oxidative solution such as a mixed solution of concentrated sulfuric acid and nitric acid or a mixed solution of concentrated sulfuric acid and aqueous hydrogen peroxide to produce a graphite intercalation compound and the graphite intercalation compound produced is washed with water and rapidly heated to expand the graphite crystal in the C-axis direction, or a powder obtained by once rolling the powder obtained above into a sheet and then pulverizing the sheet.

(Artificial Graphite)

In order to obtain artificial graphite, in general, coke is first produced. The starting material of the coke is petroleum pitch, coal pitch or the like and this starting material is carbonized into coke. From the coke, graphite powder is generally obtained by, for example, a method of pulverizing and then graphitizing the coke, a method of graphitizing the coke itself and then pulverizing the graphitized coke, or a method of adding a binder to the coke, forming and baking the resultant mixture, and graphitizing and then pulverizing the baked product (hereinafter, the coke and the baked product are collectively called "coke and the like") into powder. The starting material coke and the like may preferably be hindered from the growth of crystal and preferably heat-treated at 2,000° C. or less, more preferably 1,200° C. or less.

The method of graphitization is not particularly limited, but the graphitization may be performed by, for example, a method of using an Acheson furnace where the powder is enclosed in a graphite crucible and an electric current is directly passed therethrough, or a method of heating the powder by means of a graphite heating element.

(Pulverizing and Classifying Method)

The carbonaceous material such as coke, artificial graphite and natural graphite can be pulverized by using a high-speed rotary mill (e.g., hammer mill, pin mill, cage mill), a ball mill (e.g., roll mill, vibrating mill, planetary mill) or a stirring mill (e.g., bead mill, attritor, flow tube-type mill, annular mill). In addition, a fine pulverizer such as screen mill, turbo mill, super micron mill and jet mill may also be used by selecting the conditions therefor. The carbonaceous material such as coke and natural graphite is pulverized by using such a mill and, by selecting the pulverization conditions and if desired, classifying the powder, whereby the average particle size and the particle size distribution can be controlled.

The method of classifying the carbonaceous material such as coke, artificial graphite and natural graphite may be any method, as long as the separation can be attained. For example, sieving or an air classifier such as forced vortex-type centrifugal classifier (e.g., micron separator, turboplex, turbo classifier, super separator) and inertial classifier (e.g., reformed virtual impactor, elbow jet) may be used. Also, a wet precipitation separation method, a centrifugal classification method or the like may be used.

(Preferred Component in Component (b))

The component (b) in the present invention may preferably contain vapor-phase grown carbon fiber and/or carbon nano tubes in an amount of 0.1-50 mass %, more preferably 0.1-45 mass %, particularly preferably 0.2-40 mass %. If the content is below 0.1 mass %, the improvement in the electroconductivity can be insufficient. On the other hand, if the content exceeds 50 mass %, the resultant molding property is liable to be deteriorated.

The vapor-phase grown carbon fiber or carbon nanotubes may preferably contain boron in an amount of 0.05-5 mass %, more preferably 0.06-4 mass %, particularly preferably be 0.06-3 mass %. If the content is below 0.05 mass %, the effect of the boron incorporation to improve the electroconductivity is liable to be small. On the other hand, if the addition amount thereof exceeds 5 mass %, the amount of the resultant impurity or foreign material becomes large, and the other property is liable to be deteriorated.

(Vapor-Phase Grown Carbon Fiber)

The vapor-phase grown carbon fiber may be obtained, for example, by causing thermal decomposition reaction using a starting material organic compound such as benzene, toluene or natural gas together with a hydrogen gas at from 800 to 1,300° C. in the presence of a transition metallic material catalyst such as ferrocene. The obtained vapor-phase grown carbon fiber (e.g., those having a fiber diameter of 0.5-10 μm) may preferably be further subjected to a graphitization treatment at about 2,300 to 3,200° C., more preferably a graphitization treatment together with a graphitization catalyst such as boron, boron carbide, beryllium, aluminum or silicon at about 2,300 to 3,200° C.

(Carbon Nanotube)

The carbon nanotube has recently been noticed by industry not only by its mechanical strength but also by its field emission function and hydrogen absorption function and, further, its magnetic function. This type of carbon nanotube is also called graphite whisker, filamentous carbon, graphite fiber, extra-fine carbon tube, carbon tube, carbon fibril, carbon microtube or carbon nanofiber. The carbon nanotube may generally have a fiber diameter of about 0.5-100 nm.

The carbon nanotube includes a single layer carbon nanotube where a graphite film forming the tube is a single layer, and a multilayer carbon nanotube where the graphite film is composed of multiple layers. In the present invention, either of these single layer carbon nanotube and multilayer carbon nanotube may be used. The single carbon nanotube is preferred, because a cured product having a higher electroconductivity or mechanical strength is liable to be obtained.

The carbon nanotube may be manufactured, for example, by an arc discharge method, a laser evaporation method or thermal decomposition method, which are described in "Carbon Nanotube no Kiso (Fundamental Study of Carbon Nanotube)", written by Saito and Bando, pages 23 to 57, Corona-Sha Shuppan (1998). For enhancing the purity, the carbon nanotube obtained may further be purified by a hydrothermal method, a centrifugal separation method, an ultrafiltration method, a thermal decomposition method or the like. For removing impurities, the carbon nanotube may preferably be subjected to a high-temperature treatment in an inert gas atmosphere at about 2,300 to 3,200° C., more preferably a high-temperature treatment at about 2,300 to 3,200° C. in an inert gas atmosphere together with a graphitization catalyst such as boron, boron carbide, beryllium, aluminum and silicon.

(Additive)

For the purpose of improving the hardness, strength, electroconductivity, moldability, durability, weather resistance, water resistance and the like, the electroconductive resin composition for providing a low-elastic modulus layer and a high-elastic modulus layer according to the present invention may further contain, as desired, additives such as glass fiber, whisker, metallic oxide, organic fiber, ultraviolet stabilizer, antioxidant, mold lubricant or releasing agent, lubricant, water repellent, thickener, shrinkage-reducing agent, hydrophilicity-imparting agent, etc.

(Production Process for Composition)

The process for producing the electroconductive resin composition for providing a low-elastic modulus layer and a high-elastic modulus layer according to the present invention is not particularly limited. It is preferred, for example, that the-mentioned respective components are mixed as uniformly as possible, by using a mixer or kneading machine generally used in the field of resin, such as roll, extruder, kneader, Banbury mixer, Henschel mixer, and planetary mixer.

Further, it is also possible to use a method wherein the component (a) is prepared in advance, and then is mixed with the component (b), or a method wherein the component (a) is kneaded in the presence of the component (b). However, the production process usable in the present invention is not limited to these specific examples.

In the present invention, it is possible that an electroconductive resin composition is prepared by mixing or kneading, and then is crushed or granulated as desired for the purpose of facilitating the supply of the material to a molding machine, a mold or die. In the case of the crushing, it is possible to use a homogenizer, a Wiley crusher, a high-speed rotary crusher (such as hammer mill, pin mil, cage mil, and blender). It is preferred to crush the composition under cooling for the purpose of preventing the cohesion or agglomeration of the respective raw materials. In the case of the granulation, it is possible to use a method wherein an extruder, a luder, co-kneader, etc., is used to form the composition into pellets, or a method wherein a pan-type granulator is used.

(Fuel Cell Separator)

The process for producing the fuel cell separator composition is not particularly limited. It is possible that, in the case of the provision of a low-elastic modulus layer and a high-elastic modulus layer, the respective layers are once molded into a sheet form by using an extruder molding machine, a roll molding machine, a calender molding machine, a compression molding machine, etc. Then, it is possible that the thus obtained low-elastic modulus layer and high-elastic modulus layer are superposed or laminated with each other so that they are combined to provide a unified product, by using at least one molding method selected from: rolling, compression molding, and stamping, to thereby provide a separator having grooves for supplying hydrogen and oxygen on both side thereof. For the purpose of obviating voids or air in the separator, it is preferred to conduct the molding in a vacuum.

Alternatively, it is also possible that in the case of the provision of a low-elastic modulus layer and a high-elastic modulus layer, a laminate in a sheet from is molded by using at least one molding method selected from: rolling, multi-layer extruding, multi-layer injection molding, compression molding, or stamping; and then the thus obtained combined sheet is subjected to compression molding or stamping, so that grooves for supplying hydrogen and oxygen are formed on both side of a separator. For the purpose of obviating voids or air in the separator, it is preferred to conduct the molding in a vacuum.

The thus obtained sheet may further be cut or punched so as to provide an intended size, and the resultant sheet is inserted into a mold, and then is shaped by a compression molding machine to thereby obtain a molded product. In this case, it is also possible to insert two or more sheets into a mold, so that the sheets are disposed in the mold in parallel, or superposed with each other. In order to obtain a good product substantially having no defects, it is preferred to provide a vacuum inside the cavity.

EXAMPLES

Hereinbelow, the present invention will be described in more detail by referring to Examples, but the present invention is by no means limited to these Examples.

The respective properties of a molded product (laminate, etc.) were measured in the following manner.

(Contact Resistance)

Figure 4:
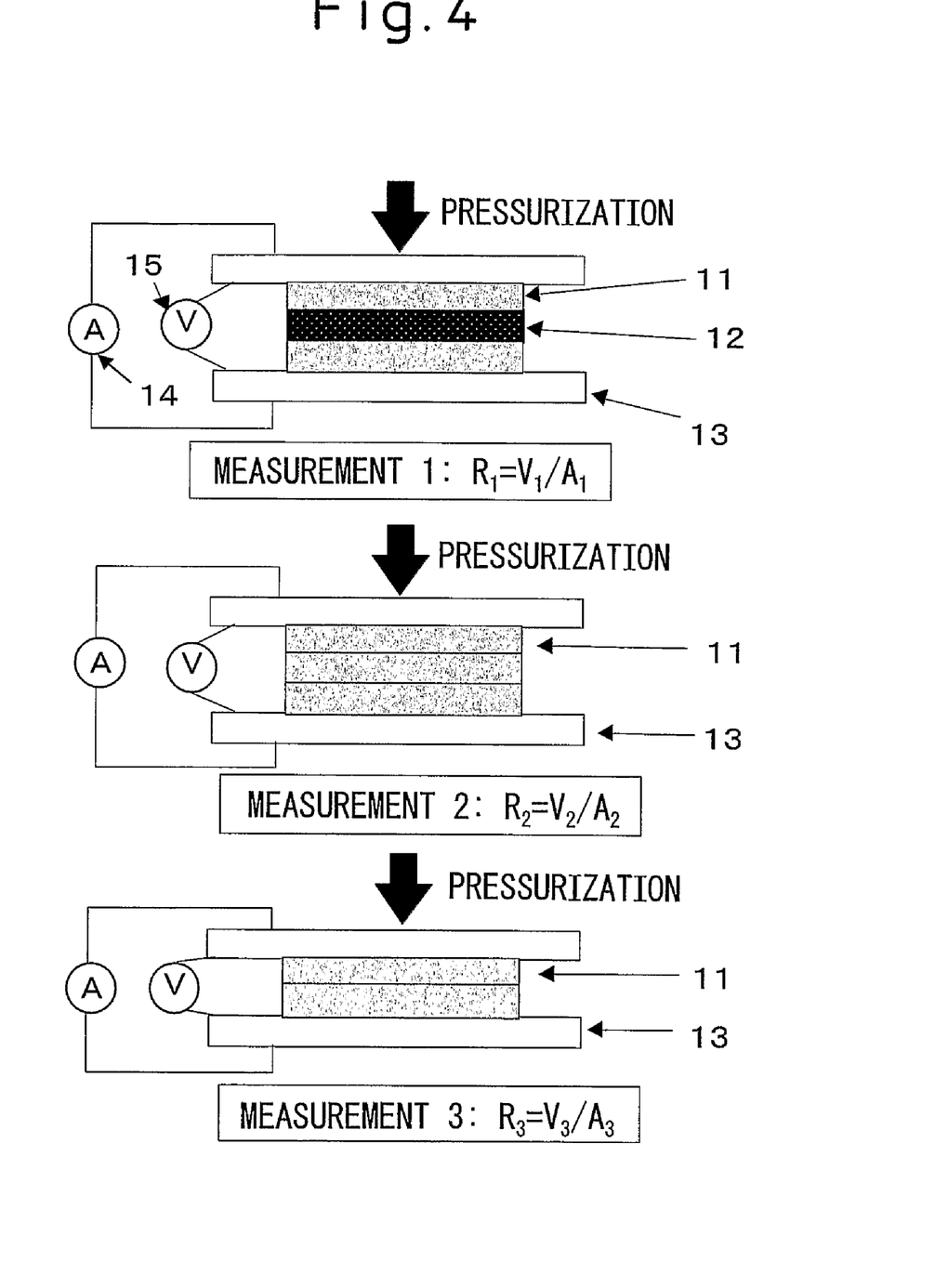
FIG. 4 is a schematic sectional view for explaining a method of measuring a contact resistance.

The contact resistance was measured by a four-probe method as shown in FIG. 4, to thereby obtain three contact resistance values (Rc) with respect to a carbon paper (TGP-H-060, mfd. by Toray Industries, Inc.), and the contact resistance (Rc) was calculated by using the following formula (1).

More specifically, a sample piece (20 mm×20 mm×1 mm), a carbon paper (20 mm×20 mm×0.19 mm), and a gold-plated brass plate (20 mm×20 mm×0.5 mm) were used. The sample was sandwiched with the carbon papers, and then the resultant superposition was sandwiched with two of the gold-plated brass plates. In this state, the resultant superposition was uniformly pressed at a pressure of 2 MPa and a constant-current of 1 A was flown between the gold-plated brass plates in the penetration direction between brass plates, to thereby measure the resultant voltage between the brass plates. The first resistance value ($R_1$) was calculated by using these values of the current and voltage (Measurement 1).

The second resistance value ($R_2$) was determined in the same manner as the measurement of the first resistance value ($R_1$) except that three sheets of the carbon papers were sandwiched with the gold-plated brass plates (Measurement 2). Further, the third resistance value ($R_3$) was determined in the same manner as the measurement of the first resistance value ($R_1$) except that two sheets of the carbon papers were sandwiched with the gold-plated brass plates (Measurement 3).

Based on the thus obtained three resistance values, the contact resistance (Rc) was calculated by using the following formula (1).

$$R_c = (R_1 + R_2 - 2R_3) \times S/2 \quad (1)$$

Rc: Contact resistance ($\Omega cm^2$),
S: Contact surface area ($cm^2$),
$R_1$: Resistance value ($\Omega$) obtained in Measurement 1,
$R_2$: Resistance value ($\Omega$) obtained in Measurement 2, and
$R_3$: Resistance value ($\Omega$) obtained in Measurement 3.

(Penetration Resistance)

Figure 5:
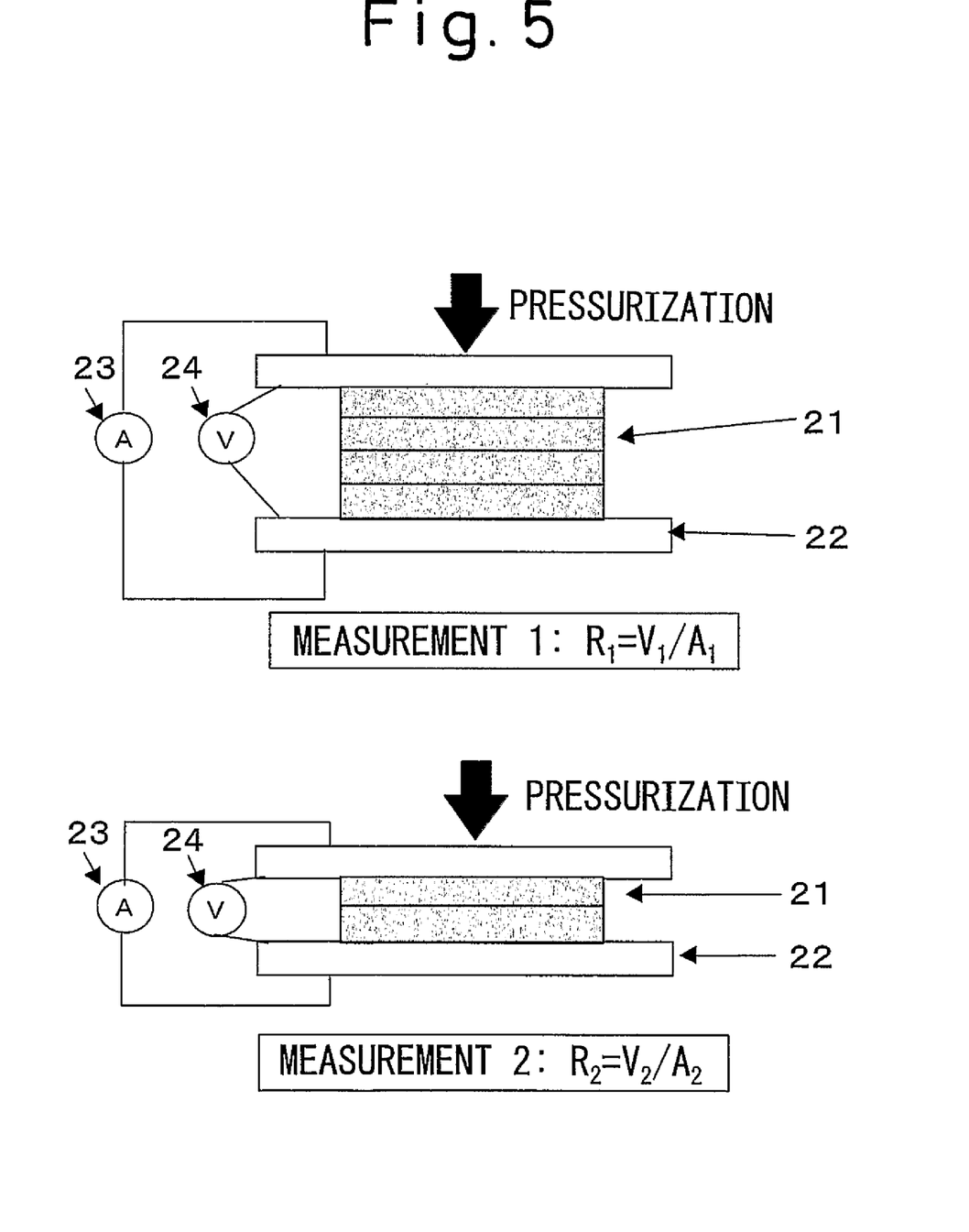
FIG. 5 is a schematic sectional view for explaining a method of measuring a penetration resistance.

Penetration resistance was measured by a four-probe method as shown in FIG. 5.

More specifically, four sample pieces (50 mm×50 mm×2 mm) were superposed, and were sandwiched with two of the gold-plated brass plates. In this state, the resultant superposition was uniformly pressed at a pressure of 2 MPa and a constant-current of 1 A was flown between the gold-plated brass plates in the penetration direction between brass plates, to thereby measure the resultant voltage between the brass plates. The first resistance value ($R_1$) was calculated by using these values of the current and voltage (Measurement 1).

The second resistance value ($R_2$) was determined in the same manner as the measurement of the first resistance value ($R_1$) except that two sample pieces were superposed, and were sandwiched with two of the gold-plated brass plates (Measurement 2).

Based on the thus obtained two resistance values, the penetration resistance (Rt) was calculated by using the following formula (2). That is, a subtraction was obtained from the values $R_1$ and $R_2$, and the resultant subtraction was multiplied by the Contact surface area (S), and then divided by the thickness (t) of two sample pieces, to thereby calculate the penetration resistance (Rt).

$$R_t = (R_1 - R_2) \times S/t \quad (2)$$

Rc: Penetration resistance ($\Omega cm$),
S: Contact surface area ($cm^2$),
$R_1$: Resistance value ($\Omega$) obtained in Measurement 1,
$R_2$: Resistance value ($\Omega$) obtained in Measurement 2, and
t: thickness of two sample pieces.

(Bending Strength, etc.)

The bending strength, bending elastic modulus and bending strain were measured by using Autograph (AG-10 kNI), mfd. by Shimadzu Corporation. In accordance with JIS K 6911, a test piece (80 mm×10 mm×4 mm) was subject to the measurement in the three-point bending strength method under the conditions of a span interval of 64 mm, and a bending rate of 1 mm/min.

The materials used in Examples are as follows.

Component (a): The respective resin compositions as shown in the following Table 1 were used. In the table, the composition ratios are described in terms of mass %.

As a polypropylene, SunAllomer PX900N mfd. by SunAllomer Ltd. was used. As a styrene-ethylene-butylene-styrene block copolymer (SEBS), Kraton G1652 mfd. by Kraton Polymer Japan Co., Ltd. was used. As at hydrogenated styrene-butadiene rubber (H-SBR) and an ethylene-propylene-diene copolymer (EPDM), Dynaron 1320 P and EP 57 P, both mfd. by JSR Co., Ltd. were used. As a polyvinylidene fluoride (PVDF), Neoflon VW -410 mfd. by Daikin Industries, Ltd. was used. As a soft acrylic acid resin, Parapet SA-FW001 mfd. by Kuraray Co., Ltd. was used.

TABLE 1

| | | (unit: mass %) | | | | | |
|---|---|---|---|---|---|---|---|
| | | a1 | a2 | a3 | a4 | a5 | a6 |
| Polypropylene | SunAllomer PX900N | 60 | 50 | 20 | | 100 | |
| SEBS | Kraton G1652 | 40 | | 80 | | | |
| H-SBR | Dynaron 1320P | | 50 | | | | |
| PVDF | Neoflon VW-410 | | | | 70 | | 100 |
| Soft acrylic resin | Parapet SA-FW001 | | | | 30 | | |

<Component (b)>: Electroconductive Substance

<b-1>: Graphite Fine Powder containing Boron

MC Coke mfd. by MC Carbon K.K., which is a non-needle type coke was coarsely pulverized into a size of 2 to 3 mm or less by a pulverizer [mfd. by Hosokawa Micron K.K.]. The coarsely pulverized product was finely pulverized by a jet mill (IDS2UR, mfd. by Nippon Pneumatic K.K.). Thereafter, the thus obtained powder was classified so as to adjust the particle size thereof to a desired value. The particles of 5 μm or less were removed by air classification by using a turbo classifier (TC15N, mfd. by Nisshin Engineering K.K.).

To a portion (14.4 kg) of the finely pulverized product, 0.6 kg of boron carbide ($B_4C$) was added and then mixed therewith by a Henschel™ mixer at 800 rpm for 5 minutes. The resulting mixture was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. in an argon gas atmosphere. The resultant product was allowed to cool, the resultant powder was taken out from the crucible to thereby obtain 14 kg of graphite powder. The thus obtained graphite powder had an average particle size of 20.5 μm, and a boron content of 1.9 mass %.

<b-2>: Vapor-Phase Grown Carbon Fiber

A mixture of vapor-phase grown carbon fiber ((hereinafter, referred to as "VGCF" (registered trade mark)) mfd. by Showa Denko K.K., and component (b-1), i.e., graphite fine powder 95 mass % of the component (b-1) and 5 mass % of VGCF were mixed by using a Henschel mixer. The resultant carbon material mixture had an average particle size of 12.4 μm, and a B content of 1.3 mass %.

As the vapor-phase grown carbon fiber, VGCF-G (fiber diameter 0.1-0.3 μm, fiber length 10-50 μm), mfd. by Showa Denko K.K., was used.

<b-3>: A Mixture of Carbon Nanotube (Hereinafter, Referred to as "CNT") and Component (b-1), i.e., Graphite Fine Powder 95 mass % of the component (b-1) and 5 mass % of CNT were mixed by using a Henschel mixer. The resultant carbon material mixture had an average particle size of 9.2 μm, and a b content of 1.2 mass %.

The carbon nanotube was obtained in the following manner.

A hole having a diameter of 3 mm, and a depth of 30 mm was bored in a graphite rod having a diameter of 6 mm and a length of 50 mm from the tip thereof along the center axis, and the hole was packed with a mixture powder of rhodium (Rh): platinum (Pt):graphite (C)=1:1:1 (mass ratio), to thereby form an anode. On the other hand, there was formed a cathode having a diameter of 13 mm and a length of 30 mm which comprised graphite having a purity of 99.98 mass %.

These electrodes were disposed in a reaction container so that they were disposed opposite to each other, and the electrodes were connected to a direct current power supply. The inside of the reaction container was replaced with helium gas having a purity of 99.9 vol. % or more, and direct current arc discharge was conducted. Thereafter, the soot which had been attached to the inner wall of the reaction container (chamber soot), and the soot which had been accumulated on the cathode (cathode soot) were collected. The pressure in the reaction container and the electric current were 600 Torr and 70A, respectively. During the reaction, the anode and the cathode were operated so that the gap between the anode and the cathode always became 1-2 mm.

The thus collected soot was charged into a mixture solvent comprising water and ethanol (mixing mass ratio=1:1), and then was dispersed therein using ultrasound, and the resultant dispersion was collected and the solvent was removed by using a rotary evaporator. The thus obtained sample was dispersed in a 0.1% or more-aqueous solution of benzalkonium chloride as a cationic surfactant by using supersonic waves, and then was subjected to centrifugal separation at 5000 rpm for 30 min., and the resultant dispersion was collected. Further, the dispersion was purified by heat-treating the dispersion in air at 350° C. for five hours, to thereby obtain carbon nanotube having a fiber diameter of 1-10 nm and a fiber length of 0.05-5 μm.

<A1-A6: Low-Elastic Modulus Compositions; B1, B2: High-Elastic Modulus Compositions>

The respective raw materials as shown in the Tables 1 and 2 were kneaded by using Labo-Plastomill (mfd. by Toyo Seiki Seisakusho K.K., Model 50C150) for 7 min., at a temperature of 200° C., and 45 rpm. Each of the resultant kneaded product was charged into a mold for providing a plate of 100 mm×100 mm×1.5 mm, and was heated at 230° C., as a preheating treatment of 3 min., and then for 3 min., under applied pressure of 30 MPa by using a 50t-compression molding machine. Then, the resultant product was cooled by using a cooling press at a temperature of 25° C., and a pressure of 15 MPa for two minutes, to thereby obtain a cured product.

The physical properties of the thus obtained molded products are shown in the following Table 2.

TABLE 2

| | | low-elastic modulus composition | | | | | | high-elastic modulus composition | |
|---|---|---|---|---|---|---|---|---|---|
| | | A1 | A2 | A3 | A4 | A5 | A6 | B1 | B2 |
| resin composition | a1 | 15 | | | | | | | |
| | a2 | | 15 | | 15 | 15 | | | |
| | a3 | | | 15 | | | | | |
| | a4 | | | | | | 25 | | |
| | a5 | | | | | | | 15 | |
| | a6 | | | | | | | | 25 |
| electroconductive substance | b1 | 85 | 85 | 85 | | | 75 | 85 | 75 |
| | b2 | | | | 85 | | | | |
| | b3 | | | | | 85 | | | |
| volume resistivity | mΩcm | 6.6 | 8.1 | 6.5 | 6.8 | 5.8 | 7.8 | 5.8 | 14 |
| contact resistance | mΩcm$^2$ | 3.6 | 3.9 | 3.1 | 2.9 | 2.1 | 3.8 | 3.2 | 5.2 |
| penetration resistance | mΩcm | 12 | 9.8 | 9.5 | 9.3 | 8.7 | 9.6 | 40 | 34 |
| bending strength | MPa | 26 | 21 | 18 | 23 | 26 | 23 | 49 | 52.2 |
| bending elastic modulus | MPa | 1790 | 1150 | 960 | 1210 | 1320 | 3200 | 10500 | 11200 |
| bending strain | % | 2 | 5 | 6.2 | 6.2 | 6.5 | 3 | 0.78 | 0.82 |

Example 1

The composition A1 and the composition B1 as shown in the above Table 2 were respectively shaped into sheets having a width of 100 mm at a temperature of 250° C., 40 rpm by using a 40φ (diameter) single-screw extruder (VS 40/26 Bent Type, mfd. by Tanabe Plastic Machine Co., Ltd.). Each of the resultant sheets was rolled at a temperature of 180° C. by use of rolls, so that the thickness of the composition A1 was adjusted to 0.6 mm, and the thickness of the composition B1 was adjusted to 1.8 mm. Then, these sheets were laminated in order of A1/B1/A1, so as to provide a laminated product having such a structure, and charged into a mold capable of providing a flat plate having a size of 100 mm×100 mm×1.5 mm, and was preheated at 240° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

Examples 2-5

The compositions A2-A5 and the composition B1 as shown in the above Table 2 were respectively shaped into sheets having a width of 100 mm at a temperature of 250° C., 40 rpm by using a 40φ (diameter) single-screw extruder (VS 40/26 Bent Type, mfd. by Tanabe Plastic Machine Co., Ltd.). Each of the resultant sheets was rolled at a temperature of 180° C. by use of rolls, so that the thickness of each of the compositions A2-A5 was adjusted to 0.4 mm, and the thickness of the composition B1 was adjusted to 2.2 mm. Then, these sheets were laminated in order of A2/B1/A2, A3/B1/A3, A4/B1/A4, order of A5/B1/A5, respectively, so as to provide a laminated product having each of such structures, and charged into a mold capable of providing a flat plate having a size of 100mm×100 mm×1.5 mm, and was preheated at 240° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

Example 6

The composition A6 and the composition B2 as shown in the above Table 2 were respectively shaped into sheets having a width of 100 mm at a temperature of 220° C., 40 rpm by using a 40φ (diameter) single-screw extruder (VS 40/26 Bent Type, mfd. by Tanabe Plastic Machine Co., Ltd.). Each of the resultant sheets was rolled at a temperature of 185° C. by use of rolls, so that the thickness of the composition A6 was adjusted to 0.4 mm, and the thickness of the composition B2 was adjusted to 2.2 mm. Then, these sheets were laminated in order of A6/B2/A6, so as to provide a laminated product having such a structure, and charged into a mold capable of providing a flat plate having a size of 100 mm×100 mm×1.5 mm, and was preheated at 220° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

Comparative Example 1

The composition A1 and the composition B1 as shown in the above Table 2 were respectively shaped into sheets having a width of 100 mm at a temperature of 250° C., 40 rpm by using a 40φ (diameter) single-screw extruder (VS 40/26 Bent Type, mfd. by Tanabe Plastic Machine Co., Ltd.). Each of the resultant sheets was rolled at a temperature of 180° C. by use of rolls, so that the thickness of the composition A1 was adjusted to 1.2 mm, and the thickness of the composition B1 was adjusted to 0.6 mm. Then, these sheets were laminated in order of B1/A1/B1, so as to provide a laminated product having such a structure, and charged into a mold capable of providing a flat plate having a size of 100 mm×100 mm×1.5 mm, and was preheated at 240° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

Comparative Example 2

The compositions B1 and B2 as shown in the above Table 2 were respectively shaped into sheets having a width of 100 mm at a temperature of 250° C. for the composition B1, and a temperature of 220° C. for the composition B2, at 40 rpm by using a 40φ (diameter) single-screw extruder (VS 40/26 Bent Type, mfd. by Tanabe Plastic Machine Co., Ltd.). Each of the resultant sheets was rolled at a temperature of 180° C. by use of rolls, so that the thickness of the composition B2 was adjusted to 0.4 mm, and the thickness of the composition B1 was adjusted to 2.2 mm. Then, these sheets were laminated in order of B2/B1/B2, so as to provide a laminated product having such a structure, and charged into a mold capable of providing a flat plate having a size of 100 mm×100 mm×1.5 mm, and was preheated at 230° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

Comparative Example 3

The compositions A2 and A6 as shown in the above Table 2 were respectively shaped into sheets having a width of 100 mm at a temperature of 250° C. for the composition A2, and a temperature of 220° C. for the composition A6, at 40 rpm by using a 40φ (diameter) single-screw extruder (VS 40/26 Bent Type, mfd. by Tanabe Plastic Machine Co., Ltd.). Each of the resultant sheets was rolled at a temperature of 180° C. by use of rolls, so that the thickness of the composition A2 was adjusted to 0.4 mm, and the thickness of the composition A6 was adjusted to 2.2 mm. Then, these sheets were laminated in order of A2/A6/A2, so as to provide a laminated product having such a structure, and charged into a mold capable of providing a flat plate having a size of 100 mm×100 mm×1.5 mm, and was preheated at 230° C. for 3 min., and thereafter press-heated under a pressure of 15 MPa for 3 min., by using a 50t-compression molding machine. Then, the mold was cooled under the conditions of a temperature of 25° C., and a pressure of 15 MPa for 2 min., by using a cooling press, to thereby obtain a molded product. The results of the physical property measurement for the thus obtained laminated products are shown in Table 3 appearing hereinafter.

TABLE 3

|  | layer structure surface/ intermediate/ surface | surface layer thickness mm | intermediate layer thickness mm | thickness ratio surface/ intermediate | total thickness mm | volume resistivity mΩcm | contact resistance mΩcm$^2$ | penetration resistance mΩcm | bending strength MPa | bending elastic modulus MPa | bending strain % |
|---|---|---|---|---|---|---|---|---|---|---|---|
| Ex. 1 | A1/B1/A1 | 0.3 | 0.9 | 0.33 | 1.5 | 6.8 | 3.4 | 10 | 53 | 9800 | 1.2 |
| Ex. 2 | A2/B1/A2 | 0.2 | 1.1 | 0.18 | 1.5 | 7.2 | 3.6 | 8.1 | 52 | 9600 | 1.4 |
| Ex. 3 | A3/B1/A3 | 0.2 | 1.1 | 0.18 | 1.5 | 6.2 | 3.1 | 7.5 | 50 | 9800 | 1.6 |
| Ex. 4 | A4/B1/A4 | 0.2 | 1.1 | 0.18 | 1.5 | 6.9 | 2.9 | 6.9 | 53 | 10000 | 1.5 |
| Ex. 5 | A5/B1/A5 | 0.2 | 1.1 | 0.18 | 1.5 | 5.9 | 2.1 | 6.7 | 56 | 10200 | 1.7 |
| Ex. 6 | A6/B2/A6 | 0.2 | 1.1 | 0.18 | 1.5 | 7.4 | 3.7 | 12.2 | 58 | 10500 | 2.3 |
| Comp. Ex. 1 | B1/A1/B1 | 0.6 | 0.3 | 2 | 1.5 | 6.7 | 8.4 | 43 | 46 | 9900 | 0.68 |
| Comp. Ex. 2 | B2/B1/B2 | 0.2 | 1.1 | 0.18 | 1.5 | 15 | 12.8 | 64 | 44 | 10600 | 0.56 |
| Comp. Ex. 3 | A2/A6/A2 | 0.2 | 1.1 | 0.18 | 1.5 | 5.6 | 4.5 | 52 | 18 | 1300 | 3.2 |

As described in the above Table 3 showing the results of the above Examples and Comparative Examples, each of the laminates according to the present invention having a surface layer of a low-elastic modulus composition and an intermediate layer of a high elastic modulus composition had an excellent electroconductivity, and particularly had an improved penetration resistance.

On the other hand, when the surface was covered with a thick and hard layer, as in the case of Comparative Example 1, the penetration resistance was poor.

Further, each of the laminates comprising different materials as in the case of Comparative Examples 2 and 3, peeling or delamination was caused, so as to deteriorate the penetration resistance.

Example 7

The laminate obtained in Example 5 was charged into a mold capable of providing a flat plate having a size of 200× 120×1.5 mm and having grooves of 1 mm-groove width pitch and 0.5 mm-depth on both sides of the plate, and was heated at 230° C. for 3 min., under applied pressure of 50 MPa by using a 380t-compression molding machine. Then, the mold was cooled to 100° C., to thereby obtain a flat plate in the form of the fuel cell separator having grooves on both sides thereof, and having a volume resistivity of 6.8 mΩcm, a penetration resistance of 7.2 mΩcm, a contact resistance of 2.9 mΩcm, a heat conductivity of 19 W/m·K, and a gas permeability of 4.3×10$^{-9}$ cm$^2$/sec.

INDUSTRIAL APPLICABILITY

As described hereinabove, the fuel cell separator according to the present invention has excellent characteristic as a separator such that it has a low contact resistance and a low penetration resistance. Accordingly, the fuel cell separator according to the present invention is very useful. In addition, the process for producing a fuel cell separator according to the present invention may provide a fuel cell separator at a low cost, because it can produce a sheet-type laminate and then it can provide grooves on both sides of the laminate by compression molding or stamping molding, etc.

The invention claimed is:

1. A fuel cell separator having first and second surfaces, and comprising a low-elastic modulus layer (A) having a bending elastic modulus of $1.0 \times 10^1$–$6.0 \times 10^3$ MPa and a bending strain of 1% or more; and a high-elastic modulus layer (B) having a bending elastic modulus exceeding $6.0 \times 10^3$ MPa, wherein the low-elastic modulus layer (A) constitutes at least a part of one or both surfaces of the separator, wherein the layer (A) and/or layer (B) comprises an electroconductive resin composite material comprising 40-2 mass % of (a) resin binder, and 60-98 mass % of an electroconductive substance (b), and wherein the layer (A) comprises a component (a) including a thermoplastic or thermosetting resin composition of at least two components which comprises 20-99 mass % of an elastomer; and the layer (B) comprises a component (a) including a thermoplastic or thermosetting resin composition which comprises at least one kind of a crystalline polymer having a melting point of 100° C. or more, and/or an amorphous polymer having a glass transition point of 100° C. or more.

2. A fuel cell separator according to claim 1, wherein the layer (A) has a thickness of 0.5 mm or less, and the layer (B) has a thickness of 0.05-2 mm.

3. A fuel cell separator according to claim 1 having a layer structure of layer (A)/layer (B)/layer (A) and a total thickness of 0.2-3 mm, wherein the thickness ratio (A/B) therebetween is 0.001-1.

4. A fuel cell separator according to claim 1, wherein the component (a) constituting the layer (A) and the component (a) constituting the layer (B) comprises at least one species of a polymer of the same kinds, or components c providing a compatible polymer pair.

5. A fuel cell separator according to claim 1, wherein the component (a) is a composition comprising at least one kind selected from: phenolic resins, epoxy resins, vinyl ester resins, allyl ester resins, and 1,2-poly butadiene.

6. A fuel cell separator according to claim 1, wherein the component (a) is a composition comprising at least one kind selected from: polyolefins, polyphenyl sulfides, fluorine-containing resins, polyamides, and polyacetals.

7. A fuel cell separator according to claim 1, wherein the component (a) comprises a composition of a polyolefin, and at least one kind selected from: hydrogenated styrene-butadiene rubbers, styrene-ethylene-butylene-styrene block copolymers, styrene-ethylene-propylene-styrene block copolymers, crystalline olefin-ethylene-butylene-crystalline olefin block copolymers, styrene-ethylene-butylene-crystalline olefin block copolymers, styrene-isoprene-styrene block copolymers, and styrene-butadiene-styrene block copolymer.

8. A fuel cell separator according to claim 1, wherein the component (a) comprises polyvinylidene fluoride and soft acrylic resin.

9. A fuel cell separator according to claim 1, wherein the component (b) is at least one kind of substance selected from: metals, carbonaceous materials, electroconductive polymers, and metal-coated fillers.

10. A fuel cell separator according to claim 1, wherein the component (b) is a carbonaceous material comprising boron in an amount of 0.05-5 mass %.

11. A fuel cell separator according to claim 1, wherein the component (b) comprises 0.1-50 mass % of vapor-phase grown carbon fiber and/or carbon nanotube.

12. A fuel cell separator according to claim 11, wherein the vapor-phase grown carbon fiber or carbon nanotube contains boron in an amount of 0.05-5 mass %.

13. A process for producing a fuel cell separator having first and second surfaces, comprising a low-elastic modulus layer (A) having a bending elastic modulus of $1.0 \times 10^1 - 6.0 \times 10^3$ MPa, and a bending strain of 1% or more; and a high-elastic modulus layer (B) having a bending elastic modulus exceeding $6.0 \times 10^3$ MPa, wherein the low-elastic modulus layer (A) constitutes at least a part of one or both surfaces of the separator;

the process comprising: molding a low-elastic modulus layer (A) and a high-elastic modulus layer (B) by at least one method selected from rolling, compression molding and stamping, to thereby provide a laminate having a groove on both sides thereof.

14. A process for producing a fuel cell separator having first and second surfaces, and comprising a low-elastic modulus layer (A) having a bending elastic modulus of $1.0 \times 10^1 - 6.0 \times 10^3$ MPa, and a bending strain of 1% or more; and a high-elastic modulus layer (B) having a bending elastic modulus exceeding $6.0 \times 10^3$ MPa, wherein the low-elastic modulus layer (A) constitutes at least a part of one or both surfaces of the separator;

the process comprising: molding a low-elastic modulus layer (A) and a high-elastic modulus layer (B) by at least one method selected from multi-layer extruding, multi-layer injection molding, compression molding or rolling, to thereby provide a laminate in the form of a sheet; and forming a groove on both side of the laminate by compression molding or stamping.

15. A process for producing a fuel cell separator according to claim 13, wherein the layer (A) has a thickness of 0.5 mm or less, and the layer (B) has a thickness of 0.05-2 mm.

16. A process for producing a fuel cell separator according to claim 13, wherein the fuel cell separator has a layer structure of layer (A)/layer (B)/layer (A) and a total thickness of 0.2-3 mm, and the thickness ratio (A/B) therebetween is 0.001-1.

* * * * *